United States Patent
Jonsson et al.

(10) Patent No.: US 8,442,132 B2
(45) Date of Patent: *May 14, 2013

(54) METHOD AND APPARATUS FOR ALLOCATING PROCESSING DELAYS IN MULTI-CARRIER SYSTEMS

(75) Inventors: Elias Jonsson, Malmö (SE); Oskar Drugge, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

This patent is subject to a terminal disclaimer.

(21) Appl. No.: 12/477,168

(22) Filed: Jun. 3, 2009

(65) Prior Publication Data

US 2010/0215132 A1 Aug. 26, 2010

Related U.S. Application Data

(63) Continuation-in-part of application No. 12/391,371, filed on Feb. 24, 2009.

(51) Int. Cl.
*H04K 1/10* (2006.01)

(52) U.S. Cl.
USPC ......... 375/260; 375/144; 375/141; 375/140; 375/142; 375/148; 375/147; 375/150; 375/130; 375/316; 329/304; 329/306; 329/307

(58) Field of Classification Search ................. 375/260, 375/144, 141, 140, 142, 148, 147, 150, 130, 375/316; 329/304, 306, 307
See application file for complete search history.

(56) References Cited

U.S. PATENT DOCUMENTS

| 7,085,311 | B2 | 8/2006 | Iwasaki |
| 7,277,474 | B2 | 10/2007 | Sharma et al. |
| 2004/0072553 | A1* | 4/2004 | Wang et al. .................. 455/334 |
| 2005/0018758 | A1 | 1/2005 | Keranen et al. |
| 2006/0083292 | A1* | 4/2006 | Khayrallah et al. .......... 375/148 |
| 2010/0086088 | A1* | 4/2010 | Lie et al. ...................... 375/346 |

FOREIGN PATENT DOCUMENTS

| GB | 2350986 A | 12/2000 |
| WO | 01/52468 A1 | 7/2001 |
| WO | 2008/031761 A1 | 3/2008 |
| WO | 2010/039156 A1 | 4/2010 |

OTHER PUBLICATIONS

Author Unknown. "CDMA Cellular Radio Systems Research." Publication date unknown. Article available online at: http://www.tech.plym.ac.uk/see/research/CDMA/CDMAIntro.htm.
Hara, S. et al. "Overview of Multicarrier CDMA." IEEE Communications Magazine, Dec. 1997, pp. 126-133.

* cited by examiner

*Primary Examiner* — Zewdu Kassa
(74) *Attorney, Agent, or Firm* — Coats & Bennett, P.L.L.C.

(57) ABSTRACT

A multi-carrier linear equalization receiver, e.g., a RAKE receiver or chip equalization receiver, is described herein. The multi-carrier receiver distributes processing delays among a plurality of received carriers based on a comparison between the signal-to-interference ratios (SIRs) determined for each carrier. The receiver initially allocates a minimum number of processing delays to each carrier. In one embodiment, any remaining additional processing delays are distributed evenly between the carriers when a comparison between the largest and smallest SIR is less than or equal to a threshold. In another embodiment, the remaining additional processing delays are distributed to favor the carrier(s) with the strongest SIR(s) when the comparison between the largest and smallest SIR exceeds the threshold. By distributing the additional processing delays to favor the carriers with the strongest SIRs, the embodiments of the present invention enable system designers to limit the total number of available processing delays without sacrificing performance.

21 Claims, 5 Drawing Sheets

METHOD AND APPARATUS FOR ALLOCATING PROCESSING DELAYS IN MULTI-CARRIER SYSTEMS

The present application is a continuation-in-part application of U.S. patent application Ser. No. 12/391,371, filed 24 Feb. 2009.

BACKGROUND

The present invention relates generally to wireless receivers, and more particularly to processing delay allocation for multi-carrier receivers that receive multi-path signals.

Wireless signals often travel multiple propagation paths between a transmitter and an intended receiver. As a result, the intended receiver receives a composite signal that includes multiple images of a transmitted signal, where each image generally experiences different path delay, phase, and attenuation effects. Different signal images therefore arrive at the receiver at different times, causing a delay spread between the received signal images. The maximum delay spread between signal images depends on, among other things, the differing characteristics of the signal propagation paths.

Because the signal energy is distributed among the multiple signal images, wireless devices often use a receiver that combines the received signal images to improve the signal-to-noise ratio (SNR) of the output signal, e.g., a RAKE receiver. RAKE receivers include a plurality of RAKE fingers tuned to different delays to despread signal images. Typically, the RAKE receiver tunes its available RAKE fingers to the strongest signal images, such that each selected signal image is despread, weighted, and subsequently combined with the other selected and despread signal images. Combining multiple signal images in this manner generally improves the SNR of the received signal.

To improve wireless data rates, wireless communication systems may also use different frequency carriers for different users. To compensate for multi-path propagation issues associated with each carrier, receivers in such multi-carrier systems may include one RAKE receiver subsystem for each carrier, where each RAKE receiver subsystem includes a fixed number of RAKE fingers. Ideally, each RAKE receiver subsystem includes enough fingers to adequately process the received signal for the corresponding carrier. However, because receiver complexity increases as the number of RAKE fingers increases, the ideal RAKE finger distribution is not always possible.

SUMMARY

Embodiments of the present invention provide methods and apparatuses in a multi-carrier receiver that distributes processing delays between a plurality of received carriers based on a comparison between the signal-to-interference ratios (SIRs) determined for each carrier. In one embodiment, the receiver allocates a minimum number of processing delays to each carrier. Additional processing delays are distributed evenly between the carriers when a comparison between the largest and smallest SIR meets a first criteria, e.g., is less than or equal to a threshold. In another embodiment, the additional processing delays are distributed to favor the carrier(s) with the strongest SIR(s) when the comparison between the largest and smallest SIR meets a second criteria, e.g., is greater than a threshold. By distributing the additional processing delays to favor the carriers with the strongest SIRs, the embodiments of the present invention enable the system designers to limit the total number of available processing delays without sacrificing performance.

The embodiments may be realized in a wireless communication device as a multi-carrier linear equalization receiver, e.g., a multi-carrier RAKE or generalized RAKE receiver where the processing delays comprise finger delays, a multi-carrier chip equalization receiver where the processing delays comprise tap delays, etc. For example, when the wireless multi-carrier receiver comprises a wireless multi-carrier RAKE receiver, additional RAKE fingers are distributed between the carriers based on a comparison of the signal-to-interference ratios determined for the carriers. The multi-carrier receiver may be disposed in a wireless communication device, such as a mobile telephone, pager, laptop, personal digital assistant, (PDA), palmtop computer, PC card, etc.

DETAILED DESCRIPTION

Figure 1:
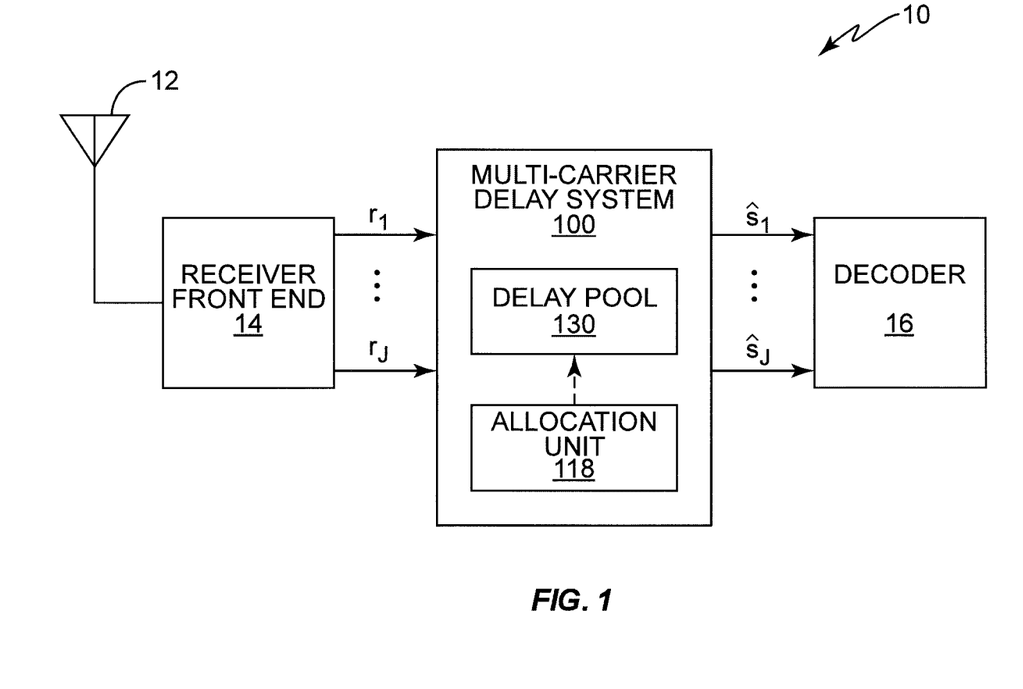
FIG. 1 shows a block diagram of an exemplary multi-carrier receiver according to one embodiment of the present invention.

FIG. 1 shows a block diagram of a multi-carrier linear equalization receiver 10 according to one embodiment of the present invention. Receiver 10 includes one or more antennas 12, receiver front-end 14, multi-carrier system 100, and decoder 16. Front-end 14 amplifies, filters, and downconverts the signal received by the antenna(s) 12 to generate a baseband signal $r_j$ for each of the J carriers. Multi-carrier system 100 may comprise any linear equalization receiver system, e.g., a symbol equalization receiver system, a chip equalization receiver system, etc., that separately processes the baseband signal images associated with different carriers to generate symbol estimates $\hat{s}_j$ for each carrier. Decoder 16 processes the symbol estimates output by the multi-carrier system 100 to recover the transmitted information bits for each carrier.

Typical multi-carrier linear equalization receivers include a separate linear equalization subsystem for each carrier, where each linear equalization subsystem includes a fixed number of processing delays for each carrier. As used herein, the term "processing delay" generally refers to the delay(s) associated with multi-path receiver structures. For example, processing delay(s) as used herein may refer to the delays associated with fingers for symbol level receiver structures (e.g., RAKE or generalized RAKE receivers), tap delay(s) for the linear filter(s) used by chip equalization receiver structures, etc. When designed for a large number of carriers, the excessively large number of processing delays required for such an arrangement makes the receiver prohibitively complex. Further, a fixed allocation is inefficient; there will be some circumstances where the linear equalization subsystem for one carrier has more processing delays than necessary, while the linear equalization subsystem for another carrier does not have enough processing delays.

The multi-carrier linear equalization system 100 of embodiments of the present invention solves this problem by providing an allocation unit 118 that distributes the processing delays in a common delay pool 130 of $N_{total}$ processing delays to the carriers. The allocation unit 118 determines the number of processing delays to allocate to each carrier based on the channel conditions associated with each carrier. When the common delay pool 130 has enough processing delays to give each carrier the desired number of processing delays, the allocation unit 118 allocates the desired number of processing delays to each carrier. However, when the common delay pool 130 does not include enough processing delays to give each carrier the desired number of processing delays, allocation unit 118 distributes the processing delays among the carriers based on the channel conditions. For example, the allocation unit 118 may determine a signal-to-interference ratio (SIR) for each carrier, and distribute the processing delays among the carriers based on a comparison between the SIRs, e.g., evenly if a difference between the SIRs is less than a threshold and according to a selected distribution process if the SIR difference exceeds the threshold.

To distribute the processing delays among the carriers when the number of desired processing delays exceeds the number of processing delays in the delay pool 130, the allocation unit 118 initially allocates a predetermined minimum number of processing delays to each antenna of each carrier. Subsequently, the allocation unit 118 determines how to allocate any remaining additional processing delays, e.g., the $N_{add\_total=Ntotal}-N_{min\_total}$ remaining processing delays, according to a selected distribution process.

For example, the allocation unit 118 may first determine $\tilde{N}_{i\_add}$, the number of additional processing delays desired by each of the $j=\{1, 2, \ldots, J\}$ carriers. The allocation unit 118 may compute the desired number of additional processing delays for each carrier as a function of the delay spread associated each carrier. For example, the allocation unit 118 may determine the desired number of additional processing delays $\tilde{N}_{j\_add}$ for the $j^{th}$ carrier by dividing the maximum delay spread for the $j^{th}$ carrier by a desired granularity, e.g., half chip, quarter chip, etc., and then subtracting the minimum number of processing delays already allocated to the $j^{th}$ carrier.

When the total number of desired additional processing delays does not exceed the total number of additional processing delays remaining in the delay pool 130, e.g., when $$\sum_{j=1}^{J} \tilde{N}_{j\_add} \leq N_{add\_total},$$

allocation unit 118 allocates the desired number of additional processing delays to each carrier, e.g., $N_{j\_add}=\tilde{N}_{j\_add}$. Because the total number of additional processing delays in the delay pool 130 may be limited to reduce receiver complexity, the multi-carrier linear equalization system 100 may not always have enough additional processing delays to give each carrier the desired amount. When the total number of desired additional processing delays for the carriers exceeds the total number of additional processing delays in the delay pool 130, e.g., $$\sum_{j=1}^{J} \tilde{N}_{j\_add} > N_{add\_total},$$

the allocation unit 118 of embodiments of the present invention compares the signal-to-interference ratios ($SIR_j$) determined for the carriers, and distributes the additional processing delays among the carriers based on the SIR comparison.

Figure 2:
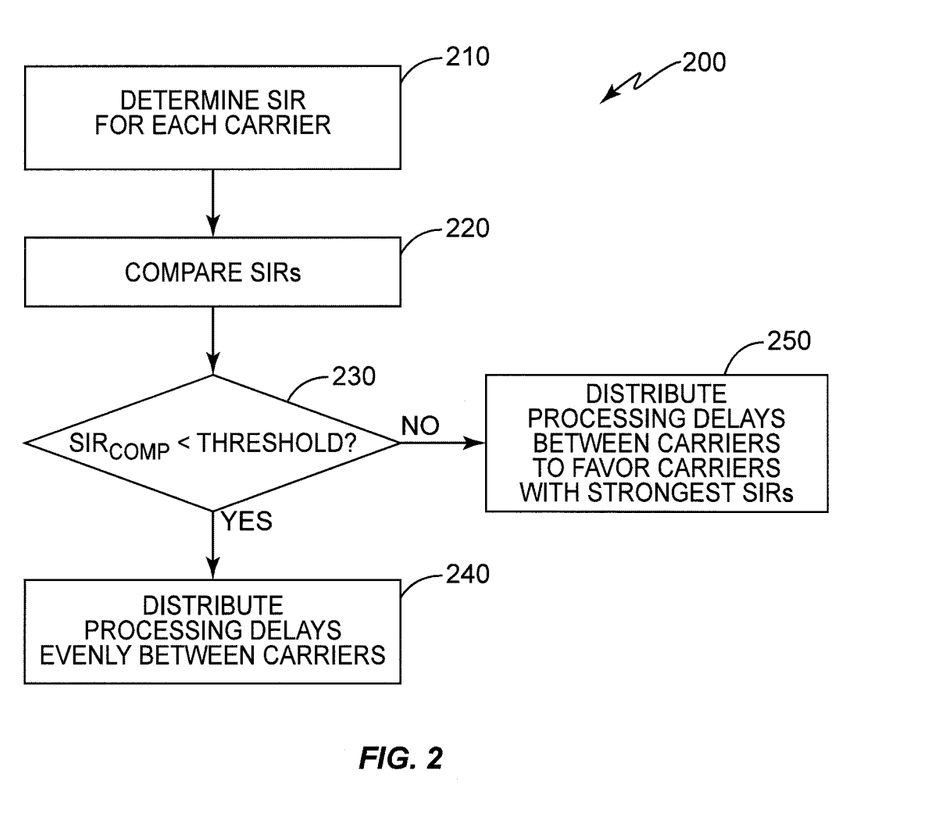
FIG. 2 shows an exemplary method for distributing processing delays between carriers according to one embodiment of the present invention.

FIG. 2 shows one exemplary process 200 executed by the allocation unit 118 when the total number of desired additional processing delays exceeds the number of available additional processing delays in the common delay pool 130. The distribution process 200 is based on signal-to-interference ratios determined for each carrier. It will be appreciated that the SIRs may include the effects of both noise and interference.

For simplicity, process 200 is described for two carriers. The allocation unit 118 determines $SIR_1$ and $SIR_2$ for respective carrier input signals $r_1$ and $r_2$ (block 210). The allocation unit 118 then compares $SIR_1$ and $SIR_2$ to determine a comparison metric $SIR_{comp}$ (block 220), and compares $SIR_{comp}$ to a threshold, where the threshold is selected to generally indicate whether or not $SIR_1$ and $SIR_2$ differ by a small amount (block 230). For example, a threshold of $\psi=0.5$ dB may be used to generally indicate whether or not $SIR_1$ and $SIR_2$ differ by more than 0.5 dB. If $SIR_{comp} \leq \psi$ (block 230), indicating that the difference between $SIR_1$ and $SIR_2$ is small, the allocation unit 118 distributes the additional processing delays evenly between the carriers (block 240). However, if $SIR_{comp} > \psi$ (block 230), indicating that the difference between $SIR_1$ and $SIR_2$ is large, the allocation unit 118 distributes the additional processing delays among the carriers to favor the carrier with the stronger SIR (block 250).

It will be appreciated that embodiments of the present invention are not limited to the threshold criterion described herein for process 200; other criteria may be used. It will also be appreciated that a basic embodiment of process 200 may omit the even delay distribution option, and instead may always distribute the additional processing delays to favor the carrier with the strongest SIR. Thus, blocks 230 and 240 in FIG. 2 are optional.

The following describes different methods for distributing the additional processing delays between $r_1$ and $r_2$ to favor the carrier with the larger SIR when the total number of desired additional processing delays for the carriers exceeds the total number of available additional processing delays, e.g., $\tilde{N}_{1\_add}+\tilde{N}_{2\_add}>N_{add\_total}$. In the following examples, it is assumed that the first carrier has the largest SIR. It will be appreciated that embodiments of the present invention are not limited to the specific delay distribution methods described herein.

Figure 3:
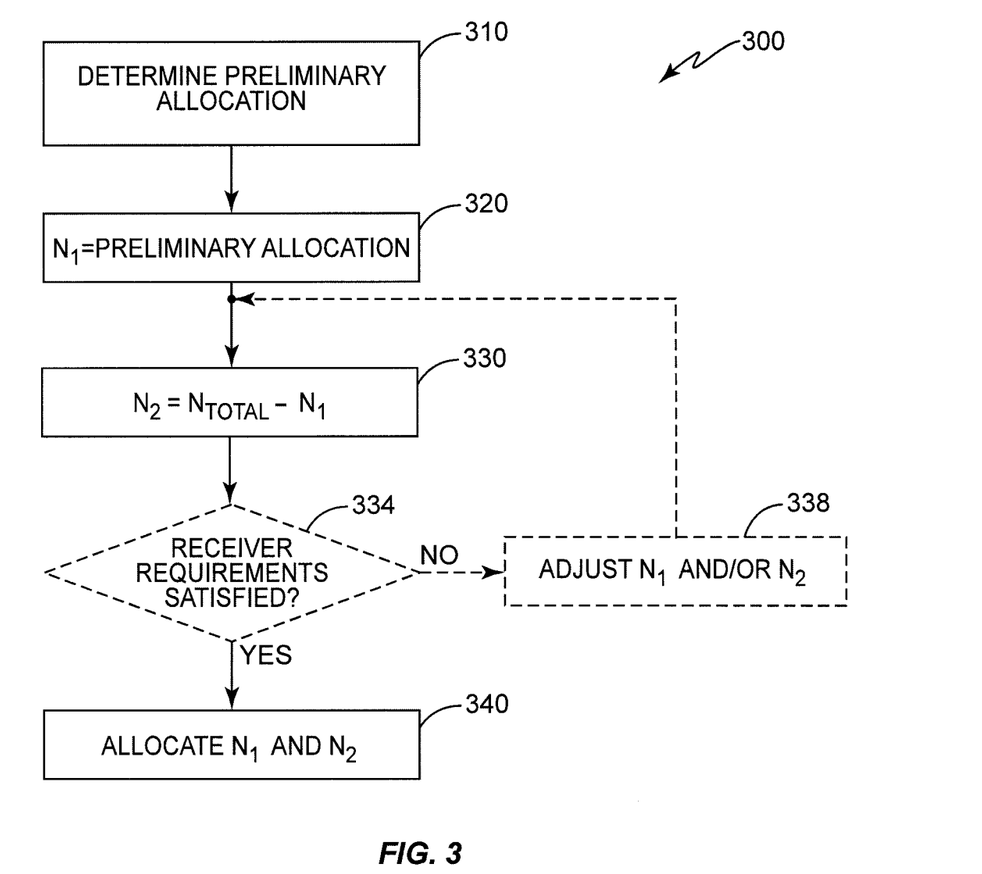
FIG. 3 shows an exemplary method for distributing the additional processing delays between carriers to favor the carrier(s) with the strongest SIR(s).

FIG. 3 shows one exemplary method 300 for distributing the additional delays to favor the carrier(s) with the larger SIR(s). For simplicity, process 300 is described for two carriers. Allocation unit 118 determines a preliminary allocation for the additional processing delays (block 310), and initially allocates the additional processing delays to the first carrier by setting $N_{1\_add}$ equal to the preliminary allocation (block 320). For example, the allocation unit 118 may determine a preliminary allocation based on a relative comparison between $\tilde{N}_{1\_add}$ and a delay differential, e.g., $N_{add\_total}-(\text{card}(\tau_2)-N_{2\_min})$ (block 310), where card($\tau_2$) represents the number of second carrier path delays. Subsequently, the allocation unit 118 initially allocates $N_{1\_add}=\min(\tilde{N}_{1\_add}, N_{add\_total}-(\text{card}(\tau_2)-N_{2\_min}))$ additional processing delays to the first carrier (block 320). The allocation unit 118 then initially allocates the remaining additional processing delays, e.g., $N_{2\_add}=N_{add\_total}-N_{1\_add}$, to the second carrier (block 330).

In some embodiments, the allocation unit 118 uses the initial allocation as the final allocation (block 340). However, other optional embodiments may further consider one or more predefined receiver requirements when distributing the additional processing delays. As long as the delay distribution satisfies the predefined receiver requirement(s) (block 334), the allocation unit 118 distributes the initially allocated $N_{1\_add}$ additional processing delays to the first carrier and the initially allocated $N_{2\_add}$ additional processing delays to the second carrier (block 340). However, if the initial allocations do not satisfy the predefined requirement(s), the allocation unit 118 adjusts the initial delay allocations for the first carrier and/or the second carrier until the predetermined requirements are satisfied (block 338). For example, the allocation unit 118 may adjust $N_{1\_add}$ and/or $N_{2\_add}$ to ensure that the allocation unit 118 has a sufficient number of computational cycles to compute the combining weights for the allocated $N_{1\_add}+N_{1\_min}$ and $N_{2\_add}+N_{2\_min}$ processing delays, as discussed further below.

In another exemplary embodiment, the allocation unit 118 uses a scaling factor $\beta_1$ to enable external factors, e.g., delay spread, to control how the delay allocation favors the carrier with the higher SIR. The scaling factor $\beta_1$ is a value between 0.0 and 1.0 and may be fixed or periodically updated based on current channel or communication conditions, e.g., delay spread, Doppler frequency shift, etc. A scaling factor of 0.0 corresponds to granting a carrier 0% of the desired number of additional processing delays, while a scaling factor of 1.0 corresponds to granting the carrier 100% of the desired number of additional processing delays.

For the scaling embodiment, the preliminary allocation is determined based on a relative comparison between the total number of additional processing delays $N_{add\_total}$ and the scaled version of the desired number of additional processing delays for the first carrier $\beta_1 \tilde{N}_{1\_add}$ (block 310), wherein the allocation unit 118 initially allocates $N_{1\_add}$=min(floor$(\beta_1 \tilde{N}_{1\_add}), N_{add\_total})$ additional processing delays to the first carrier (block 320). Subsequently, allocation unit 118 initially allocates $N_{2\_add}=N_{add\_total}-N_{1\_add}$ additional processing delays to the second carrier (block 330). The allocation unit 118 then optionally considers any predefined receiver requirements before finally allocating $N_{1\_add}$ additional processing delays to the first carrier and updating the allocation of $N_{2\_add}=N_{add\_total}-N_{1\_add}$ additional processing delays to the second carrier (blocks 334, 338, 340).

In one exemplary embodiment, the allocation unit 118 sets $\beta_1=1.0$. This scaling factor guarantees that the carrier with the highest SIR will be granted as many additional processing delays as possible regardless of any other system conditions.

In another embodiment, the scaling factor $\beta_1$ is periodically adjusted based on the delay spread. For this embodiment, the scaling factor $\beta_1$ is inversely proportional to the desired number of additional processing delays, e.g., $\beta_1 \propto (1/\tilde{N}_{1\_add})$, where the desired number of additional processing delays is determined based on the root mean square (RMS) delay spread. In this case, $\beta_1$ may be periodically adjusted such that the carriers associated with channels with a low delay spread can be granted a higher percentage of the desired number of additional processing delays (e.g., 100%), while carriers associated with channels with a higher delay spread can be granted a lower percentage of the desired number of additional processing delays (e.g., 80%).

In still another embodiment, the scaling factor $\beta_1$ may be periodically adjusted based on the Doppler frequency shift of the carriers. For example, the carrier experiencing a higher Doppler shift may be allocated slightly fewer additional processing delays. This option accounts for the fact that processing in linear equalization receivers is generally less effective in the presence of high Doppler shifts, and therefore compensates for the problem that may arise when two mobile devices traveling at the same speed are associated with different carrier frequencies, and therefore have different Doppler shifts.

Another embodiment may determine a final scaling factor $\beta_1$ based on a combination of multiple different determination methods. For example, a final scaling factor $\beta_1$ may be determined based on an average of the scaling factors determined based on the delay spread and the Doppler frequency shift.

As mentioned above, when distributing the additional processing delays, the allocation unit 118 may also consider the number of additional computational cycles required to determine the combining weights for the additional processing delays allocated to the carriers. In general, X computational cycles are required to determine the combining weights for the already allocated minimum number of processing delays. The allocation unit 118 distributes the additional processing delays so that the total number of computational cycles required for the additional processing delays allocated to the carriers does not exceed the maximum number of additional computational cycles available to the receiver, e.g., cycles$(N_{1\_add})$+cycles$(N_{2\_add}) \leq$ cycles$_{max}$-X, where cycles(x) represents the number of computational cycles required to calculate x combining weights for x delays. If the total number of additional computational cycles required for the additional processing delays exceeds the maximum number of additional cycles available, the allocation unit 118 may iteratively remove one additional processing delay from one or more carrier's additional allocation until the total number of additional computational cycles required for the additional processing delays does not exceed the maximum number of additional computational cycles available to the receiver.

Alternatively, the allocation unit 118 may consider the computational cycles separately for each carrier when distributing the additional processing delays. For example, the allocation unit 118 may allocate $N_{1\_add}$ additional processing delays to $r_1$, where $N_{1\_add}$ is the maximum number of additional processing delays satisfying both $N_{1\_add} \leq$ min$(\tilde{N}_{1\_add}, N_{add\_total}-(\text{card}(\tau_2)-N_{2\_min}))$ and cycles$(N_{1\_add}) \leq$ cycles$_{max}$-X-cycles(card$(\tau_2)$)). Alternatively, the allocation unit 118 may allocate $N_{1\_add}$ additional processing delays to $r_1$, where $N_{1\_add}$ is the maximum number of additional processing delays satisfying both $N_{1\_add} \leq$ min(floor$(\beta \tilde{N}_{1\_add}), N_{add\_total})$ and cycles$(N_{1\_add}) \leq$ cycles$_{max}$-X. In either case, the allocation unit 118 may allocate $N_{2\_add}=N_{add\_total}-N_{1\_add}$ additional processing delays to $r_2$.

Figure 4:
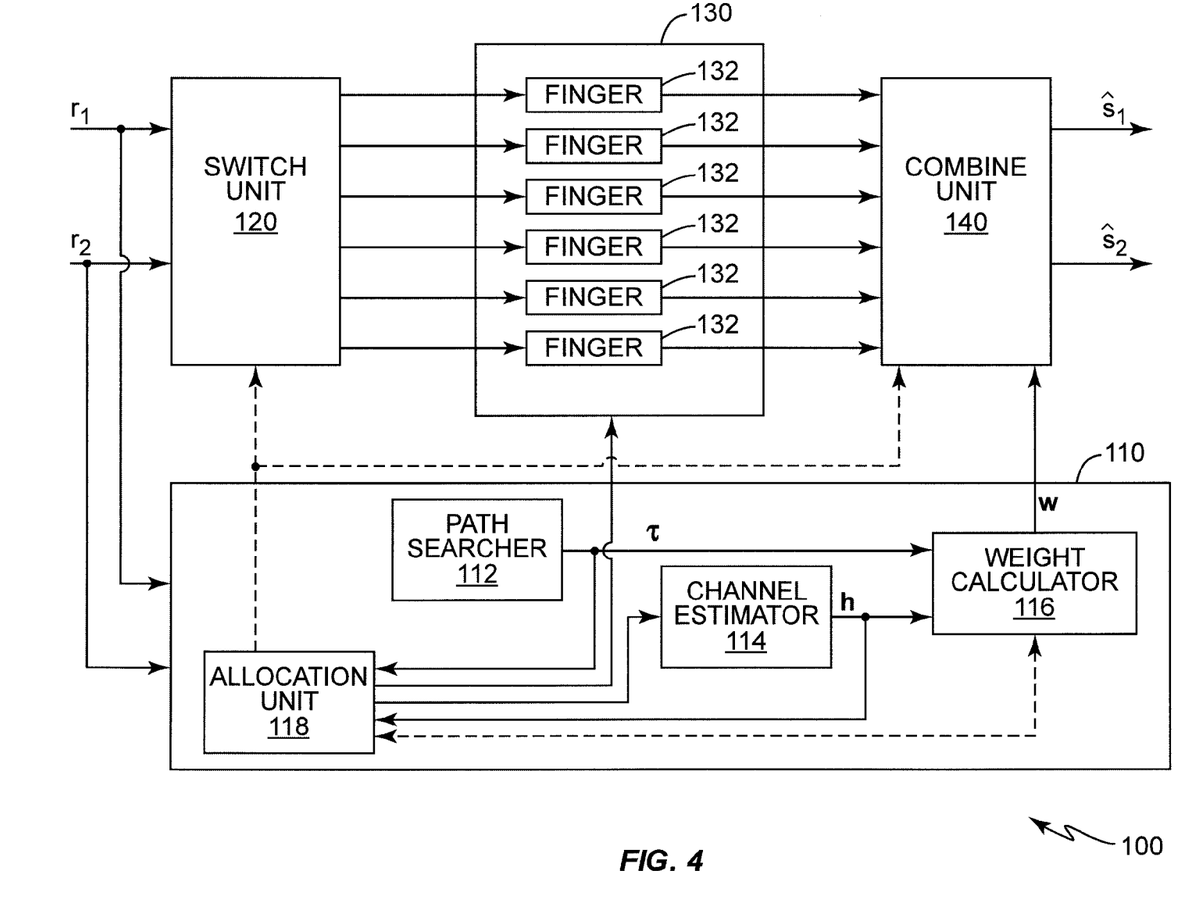
FIG. 4 shows a block diagram of an exemplary multi-carrier RAKE system for the receiver of FIG. 1.

FIG. 4 shows one exemplary multi-carrier linear equalization system 100 comprising a multi-carrier RAKE system according to one embodiment of the present invention. Multi-carrier RAKE system 100 includes a RAKE processor 110, a switch unit 120, the delay pool 130 comprising a plurality of RAKE fingers 132 (here the term "finger" is used interchangeably with the term "delay" as delays are associated with fingers), and a RAKE combine unit 140. While FIG. 4 only shows two carriers and six RAKE fingers, it will be appreciated that the multi-carrier RAKE system 100 may be used for any number of carriers and that the common delay pool 130 may include any number of RAKE fingers 132.

Processor 110 distributes the RAKE fingers 132 between the carriers, provides the corresponding path delays and combining weights for each carrier, and generates control signals for the switch unit 120 and combine unit 140 based on the determined finger distribution. Switch unit 120 selectively connects each of the baseband signals $r_1$ and $r_2$ to one or more RAKE fingers 132 responsive to the control signal. The RAKE fingers 132 delay and despread different images of the input signals $\{r_1, r_2\}$ to generate despread symbol streams.

The combine unit 140 weights and combines the despread symbol streams for each carrier to generate the symbol estimates $\hat{s}_1$ and $\hat{s}_2$ for each carrier.

The processor 110 includes a path searcher 112, channel estimator 114, weight calculator 116, and allocation unit 118. The path searcher 112 determines a set of path delays $\tau_j$ for each of the carriers based on the input signals $r_j$, while the channel estimator 114 determines channel estimates $h_j$ for the paths determined by the allocation unit 118. The weight calculator 116 determines a set of combining weights $w_j$ allocated to each carrier based on the finger delays and channel estimates. The allocation unit 118 distributes the RAKE fingers 132 according to the processes discussed above. Once allocation unit 118 determines the finger distribution, the allocation unit 118 generates the corresponding control signal for the switch unit 120 and the combine unit 140. Further, the allocation unit 118 generates a control signal for the weight calculator 116 to match the combining weights with the correct RAKE fingers 132.

Figure 5:
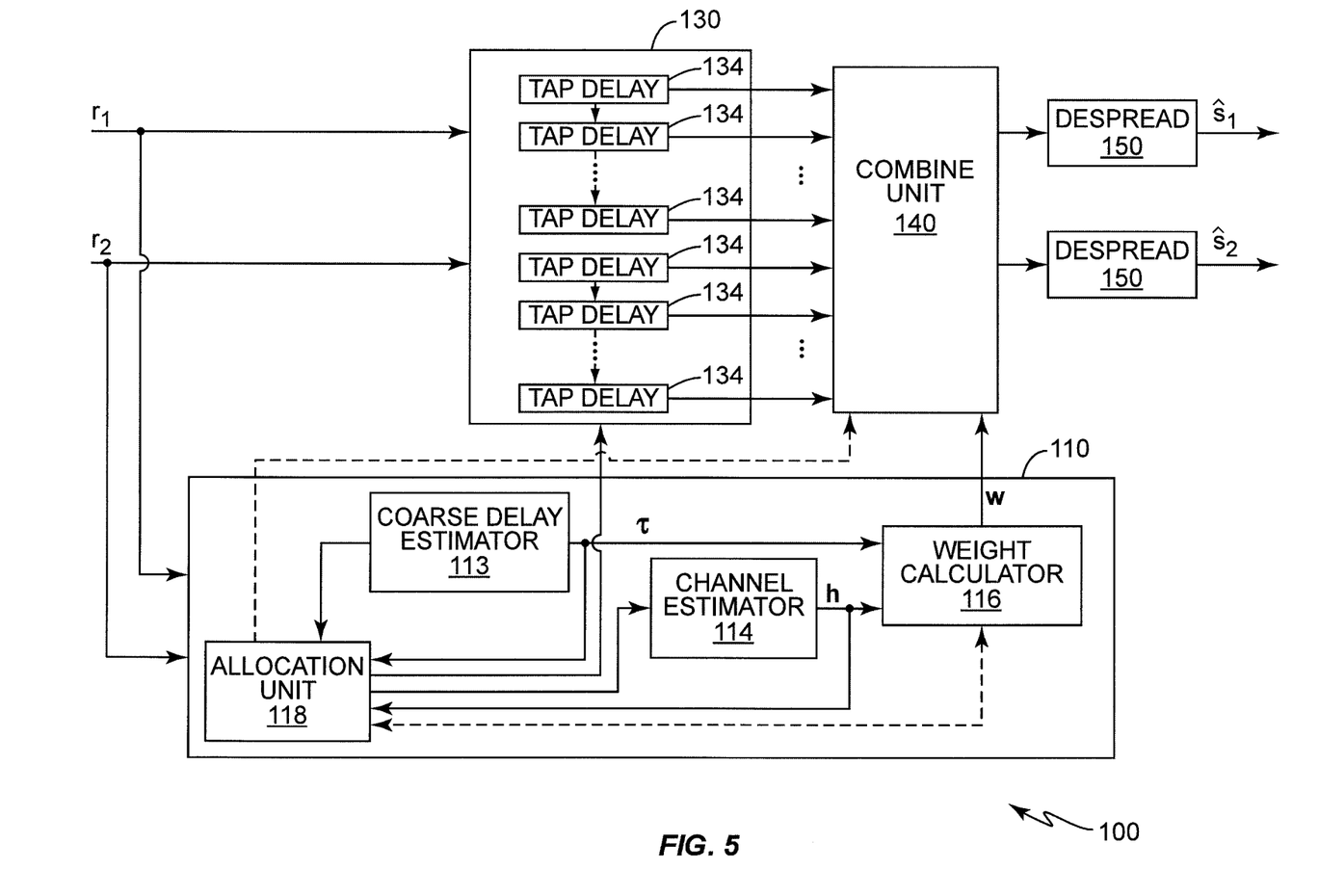
FIG. 5 shows a block diagram of an exemplary multi-carrier chip equalization system for the receiver of FIG. 1.

FIG. 5 shows another exemplary multi-carrier linear equalization system 100 comprising a multi-carrier chip equalization system according to one embodiment of the present invention, where the processing delays described above comprise linear filter tap delays. Multi-carrier chip equalization system 100 includes a processor 110, the delay pool 130 comprising a plurality of tap delays 134, a combine unit 140, and despread units 150. While FIG. 5 only shows two carriers, it will be appreciated that the multi-carrier chip equalization system 100 may be used for any number of carriers.

Processor 110 distributes the delay taps 134 among the carriers, provides the corresponding processing delays and combining weights for each carrier, and generates control signals for the combine unit 140 based on the determined tap distribution. The tap delays 134, the number of which is allocated to each carrier by the allocation unit 118, successively delay the corresponding input signal according to the delay values of the tap delays 134. The combine unit 140 weights and combines the successively delayed samples for each carrier to generate chip estimates. Despread units 150 despread the chip estimates to generate the symbol estimates $\hat{s}_1$ and $\hat{s}_2$ for each carrier.

The processor 110 includes a coarse delay estimator 113, channel estimator 114, weight calculator 116, and allocation unit 118. The coarse delay estimator 113 determines the delay value for each tap delay 134 using any known means, while the channel estimator 114 determines channel estimates $h_j$ associated with the tap delays 134 determined by the allocation unit 118. The weight calculator 116 determines the combining weight $w_j$ corresponding to each tap delay 134 based on the received signals and channel estimates. The allocation unit 118 distributes the tap delays 134 according to the processes discussed above. Once allocation unit 118 determines the tap delay distribution, the allocation unit 118 generates the corresponding control signal for the combine unit 140. Further, the allocation unit 118 generates a control signal for the weight calculator 116 to match the combining weights with the correct tap delays 134.

While not explicitly shown, the present invention also applies to other linear equalization receivers that process time-aligned signals and/or sample sets corresponding to a transmitted signal. Regardless of the type of receiver, the embodiments of the present invention allocates processing delays to each carrier of a multi-carrier signal based on SIR, and in some cases, other measures as required, e.g., computational cycles, etc., as described herein.

The embodiments discussed above are described in terms of a two-carrier system. However, each embodiment may be extended to a multi-carrier system having more than two carriers. The extended multi-carrier solution of embodiments of the present invention assumes that the total number of desired additional processing delays for all carriers exceeds the total number of additional processing delays available in the common delay pool 130, e.g., $$\sum_{j=1}^{J} \tilde{N}_{j\_add} > N_{add\_total},$$

and that $SIR_1 \geq SIR_2 \geq \ldots \geq SIR_J$. While not required, the following descriptions include the computational cycle requirement when distributing the additional processing delays 132, 134.

For the extended multi-carrier solution, the comparison metric $SIR_{comp}$ is derived from the difference between the largest and smallest SIRs, e.g., $SIR_1$ and $SIR_J$, respectively. When none of the carriers have a dominant SIR, e.g., when $SIR_{comp}$ is less than or equal to a threshold, the allocation unit 118 evenly distributes the additional processing delays 132, 134 among the carriers. For example, the allocation unit 118 may allocate $$N_{even} = \min\left(\tilde{N}_{j\_add}, \frac{N_{add\_total}}{J}\right)$$

additional processing delays 132, 134 to each carrier. When the allocation unit 118 also considers the number of computational cycles, the allocation unit 118 may further limit $N_{even}$ to the maximum number of additional processing delays 132, 134 satisfying $$\text{cycles}(N_{even}) \leq \frac{cycles_{max} - X}{J}.$$

When the comparison metric exceeds the threshold, e.g., when $SIR_1 \gg SIR_J$, the allocation unit 118 favors the carrier(s) with the stronger SIR(s). More particularly, the allocation unit 118 will, in this example, favor the first carrier over the second carrier, the second carrier over the third carrier, etc. For example, the allocation unit 118 may distribute the additional processing delays 132, 134 among the carriers based on the number of path delays for the different carriers. First, the allocation unit 118 determines the maximum number of additional processing delays 132, 134 for the first carrier ($N_{1\_add}$) that satisfy $$N_{1\_add} \leq \min\left(\tilde{N}_{1\_add}, N_{add\_total} - \sum_{i=2}^{I}(\text{card}(\tau_i) - N_{i\_min})\right),$$

and optionally $$\text{cycles}(N_{1\_add}) \leq \left(cycles_{max} - X - \sum_{i=2}^{I} \text{cycles}(\text{card}(\tau_i))\right),$$

where cycles(x) represents the number of computational cycles required to calculate x combining weights for x delays.

Subsequently, the allocation unit 118 determines the maximum number of additional processing delays 132, 134 for the second carrier ($N_{2\_add}$) that satisfy $$N_{2\_add} \le \min\left(\tilde{N}_{2\_add}, N_{add\_total} - N_{1\_add} - \sum_{i=3}^{I}(\text{card}(\tau_i) - N_{i\_min})\right),$$

and optionally $$\text{cycles}(N_{2\_add}) \le \left(\text{cycles}_{max} - X - \text{cycles}(N_{1\_add}) - \sum_{i=3}^{I}\text{cycles}(\text{card}(\tau_i))\right).$$

This process continues until the allocation unit 118 allocates the number of processing delays 132, 134 for the carrier with the lowest SIR by determining the maximum value for $N_{J\_add}$ that satisfies $$\text{cycles}(N_{I\_add}) \le \left(\text{cycles}_{max} - X - \sum_{i=1}^{I-1}\text{cycles}(N_{i\_add})\right).$$

and optionally $$N_{I\_add} = \min\left(\tilde{N}_{I\_add}, N_{add\_total} - \sum_{i=1}^{I-1}N_{i\_add}\right),$$

The scaling factor-based distribution embodiment discussed above may also be used for the extended multi-carrier solution. In this case, the allocation unit 118 may use a carrier-specific scaling factor to determine $N_{j\_add}$ for each carrier. Each scaling factor $\beta_j$ may be any value between 0.0 and 1.0, and may be determined according to any of the embodiments discussed above. First, the allocation unit 118 determines the maximum value for $N_{1\_add}$ that satisfies $N_{1\_add} \le \min(\text{floor}(\beta_1\tilde{N}_{1\_add}), N_{add\_total})$, and optionally $\text{cycles}(N_{1\_add}) \le \text{cycles}_{max} - X$. Subsequently, the allocation unit 118 determines the maximum value for $N_{2\_add}$ that satisfies $N_{2\_add} \le \min(\text{floor}(\beta_2\tilde{N}_{1\_add}), N_{add\_total} - N_{1\_add})$, and optionally $\text{cycles}(N_{2\_add}) \le (\text{cycles}_{max} - X - \text{cycles}(N_{1\_add}))$. This process continues until the allocation unit 118 allocates the number of additional processing delays 132, 134 for the carrier with the lowest SIR by determining the maximum value for $N_{J\_add}$ that satisfies $$N_{I\_add} \le \min\left(\text{floor}(\beta_I\tilde{N}_{I\_add}), N_{add\_total} - \sum_{i=1}^{I-1}N_{ji\_add}\right),$$

and optionally $$\text{cycles}(N_{I\_add}) \le \left(\text{cycles}_{max} - X - \sum_{i=1}^{I-1}\text{cycles}(N_{i\_add})\right).$$

The above describes how multi-carrier linear equalization systems 100 may distribute a common pool 130 of processing delays 132, 134 among carriers, even when the multi-carrier linear equalization system 100 limits the number of available processing delays 132, 134 to reduce the complexity of the system 100. Thus, embodiments of the present invention reduce the complexity associated with conventional multi-carrier linear equalization systems without sacrificing performance.

Embodiments of the present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of allocating a plurality of processing delays in a wireless multi-carrier receiver, the method comprising:
    determining a signal-to-interference ratio for a plurality of carriers received by the multi-carrier receiver; and
    distributing the processing delays among the carriers based on a comparison of the signal-to-interference ratios, wherein distributing the processing delays comprises:
        allocating a minimum number of processing delays to each received carrier;
        comparing a signal-to-interference ratio determined for one carrier with a signal-to-interference ratio determined for another carrier to determine a comparison metric; and
        distributing one or more additional processing delays among the carriers to favor the carrier with the larger signal-to-interference ratio when the comparison metric meets a first criteria; and
        dividing the additional processing delays equally between the carriers when the comparison metric meets a second criteria.

2. The method of claim 1 wherein the first criteria corresponds to exceeding a threshold, and wherein the second criteria corresponds to being less than or equal to the threshold.

3. The method of claim 1 wherein distributing the additional processing delays to favor the carrier with the larger signal-to-interference ratio comprises:
    determining a desired number of first processing delays for the carrier having the larger signal-to-interference ratio;
    determining a preliminary allocation based on a total number of available additional processing delays and the desired number of first processing delays; and
    allocating a first number of the additional processing delays to the carrier having the larger signal-to-interference ratio based on the preliminary allocation.

4. The method of claim 3 further comprising determining how many computational cycles are required to compute combining weights for the first number of the additional processing delays, wherein allocating the first number of the additional processing delays to the carrier having the larger signal-to-interference ratio comprises allocating the first number of the additional processing delays to the carrier having the larger signal-to-interference ratio based on the preliminary allocation and the required number of computational cycles.

5. The method of claim 3 wherein determining the preliminary allocation comprises:
    determining a delay differential between the total number of available additional processing delays and a minimum number of delay peaks corresponding to the other carrier; and setting the preliminary allocation equal to the smaller of the delay differential and the desired number of first processing delays.

6. The method of claim 3 wherein determining the preliminary allocation comprises:
scaling the desired number of first processing delays by a scaling factor, wherein the scaling factor comprises 0.0, 1.0, or a number between 0.0 and 1.0;
setting a floor value equal to the largest integer less than or equal to the scaled desired number of first processing delays; and
setting the preliminary allocation equal to the smaller of the total number of available additional processing delays and the floor value.

7. The method of claim 6 further comprising deriving the scaling factor from an inverse of the desired number of first processing delays.

8. The method of claim 6 further comprising deriving the scaling factor based on a Doppler frequency shift associated with the carrier having the larger signal-to-interference ratio.

9. The method of claim 6 further comprising:
deriving a first scaling factor from an inverse of the desired number of first processing delays;
deriving a second scaling factor based on a Doppler frequency shift associated with the carrier having the larger signal-to-interference ratio; and
determining the scaling factor based on a weighted average of the first and second scaling factors.

10. A multi-carrier receiver comprising:
a delay bank comprising a plurality of processing delays; and
a processor configured to:
determine a signal-to-interference ratio for each of a plurality of carriers received by the multi-carrier receiver;
compare the signal-to-interference ratios by comparing a signal-to-interference ratio determined for one carrier with a signal-to-interference ratio determined for another carrier to determine a comparison metric; and
distribute the processing delays among the carriers based on the signal-to-interference ratio comparisons by allocating a minimum number of processing delays to each received carrier and distributing one or more additional processing delays to favor the carrier having the larger signal-to-interference ratio when the comparison metric meets a first criteria; and
divide the additional processing delays equally among the carriers when the comparison metric meets a second criteria.

11. The multi-carrier receiver of claim 10 wherein the first criteria corresponds to exceeding a threshold, and wherein the second criteria corresponds to being less than or equal to the threshold.

12. The multi-carrier receiver of claim 10 wherein the processor is configured to distribute the additional processing delays to favor the carrier having the larger signal-to-interference ratio by:
determining a desired number of first processing delays for the carrier having the larger signal-to-interference ratio;
determining a preliminary allocation based on a total number of available additional processing delays and the desired number of first processing delays; and
allocating a first number of the additional processing delays to the carrier having the larger signal-to-interference ratio based on the preliminary allocation.

13. The multi-carrier receiver of claim 12 wherein the processor is further configured to determine how many computational cycles are required to compute combining weights for the first number of the additional processing delays, and wherein the processor is configured to allocate the first number of the additional processing delays to the carrier having the larger signal-to-interference ratio based on the preliminary allocation and the required number of computational cycles.

14. The multi-carrier receiver of claim 12 wherein the processor is configured to determine the preliminary allocation by:
determining a delay differential between the total number of available additional processing delays and a minimum number of delay peaks corresponding to the other carrier; and
setting the preliminary allocation equal to the smaller of the delay differential and the desired number of first processing delays.

15. The multi-carrier receiver of claim 12 wherein the processor is configured to determine the preliminary allocation by:
scaling the desired number of first processing delays by a scaling factor, wherein the scaling factor comprises 0.0, 1.0, or a number between 0.0 and 1.0;
setting a floor value equal to the largest integer less than or equal to the scaled desired number of first processing delays; and
setting the preliminary allocation equal to the smaller of the total number of available additional processing delays and the floor value.

16. The multi-carrier receiver of claim 15 wherein the processor is further configured to derive the scaling factor from an inverse of the desired number of first processing delays.

17. The multi-carrier receiver of claim 15 wherein the processor is further configured to derive the scaling factor based on a Doppler frequency shift associated with the carrier having the larger signal-to-interference ratio.

18. The multi-carrier receiver of claim 15 wherein the processor is further configured to derive the scaling factor by:
deriving a first scaling factor from an inverse of the desired number of first processing delays;
deriving a second scaling factor based on a Doppler frequency shift associated with the carrier having the larger signal-to-interference ratio; and
determining the scaling factor based on a weighted average of the first and second scaling factors.

19. The multi-carrier receiver of claim 10, wherein the processor is further configured to generate a distribution control signal based on the processing delay distribution; and wherein the multi-carrier receiver further comprises:
a switch unit configured to connect the processing delays in the delay bank and input signals associated with the different carriers responsive to the control signal; and
a combine unit comprising a plurality of combiners, where each combiner is configured to combine the processing delay outputs responsive to the control signal.

20. The multi-carrier receiver of claim 10 wherein the multi-carrier receiver is disposed in a wireless communication device, wherein the multi-carrier receiver comprises a multi-carrier RAKE or generalized RAKE receiver, and wherein the delay bank of processing delays comprises a finger bank of RAKE finger delays.

21. The multi-carrier receiver of claim 10 wherein the multi-carrier receiver is disposed in a wireless communication device, wherein the multi-carrier receiver comprises a multi-carrier chip equalization receiver, and wherein the delay bank of processing delays comprises a delay bank of tap delays.

* * * * *

UNITED STATES PATENT AND TRADEMARK OFFICE
CERTIFICATE OF CORRECTION

PATENT NO. : 8,442,132 B2
APPLICATION NO. : 12/477168
DATED : May 14, 2013
INVENTOR(S) : Jonsson et al.

It is certified that error appears in the above-identified patent and that said Letters Patent is hereby corrected as shown below:

In the Specification

In Column 3, Line 28, delete "$=_{Ntotal}-N_{min-total}$" and insert -- $=N_{total}-N_{min-total}$ --, therefor.

In Column 9, Lines 23-32, delete "
$$cycles(N_{I\_add}) \leq \left( cycles_{max} - X - \sum_{i=1}^{I-1} cycles(N_{i\_add}) \right)$$
and optionally
$$N_{I\_add} = \min\left( \bar{N}_{I\_add}, N_{add\_total} - \sum_{i=1}^{I-1} N_{i\_add} \right),$$
" and insert --
$$N_{I\_add} = \min\left( \bar{N}_{I\_add}, N_{add\_total} - \sum_{i=1}^{I-1} N_{i\_add} \right), \text{ and optionally}$$
$$\mathbf{cycles}\left(N_{I\_add}\right) \leq \left( cycles_{max} - X - \sum_{i=1}^{I-1} \mathbf{cycles}\left(N_{i\_add}\right) \right)$$
--, therefor.

Signed and Sealed this
Eighth Day of October, 2013

Teresa Stanek Rea
*Deputy Director of the United States Patent and Trademark Office*